H. A. HIGGINS.
Attachment to Thrashing-Machines.
No. 215,617.                         Patented May 20, 1879.
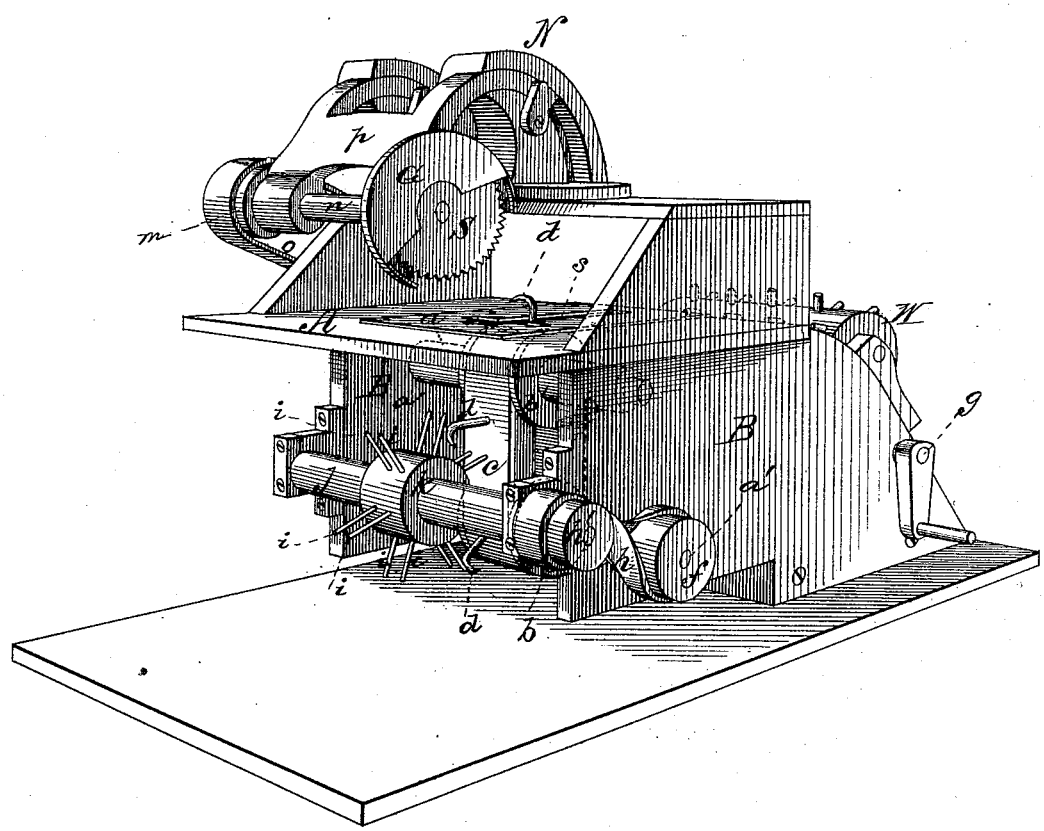
WITNESSES                                    INVENTOR
John A. ...                                  Hibbard A. Higgins,
F. J. Masi.                                  by E. W. Anderson
                                                    his ATTORNEY
N. PETERS, PHOTO-LITHOGRAPHER, WASHINGTON, D. C.

UNITED STATES PATENT OFFICE.

HIBBARD A. HIGGINS, OF AURORA, ILLINOIS.

IMPROVEMENT IN ATTACHMENTS TO THRASHING-MACHINES.

Specification forming part of Letters Patent No. 215,617, dated May 20, 1879; application filed March 29, 1879.

*To all whom it may concern:*

Be it known that I, HIBBARD A. HIGGINS, of Aurora, in the county of Kane and State of Illinois, have invented a new and valuable Improvement in Attachments to Thrashing-Machines; and I do hereby declare that the following is a full, clear, and exact description of the construction and operation of the same, reference being had to the annexed drawing, making a part of this specification, and to the letters and figures of reference marked thereon.

The figure in the drawing is a representation of a perspective view of my invention.

This invention has relation to improvements in attachments to thrashing-machines.

The object of the invention is to provide means for cutting and removing the wire bands from bundles of grain after they are placed on the table and before they reach the scattering-cylinder.

The nature of the invention will be fully set forth hereinafter.

In the accompanying drawings, the letter A designates a feed-table, usually of rectangular form, and supported by the side pieces B, or other equivalent means. The table A has formed in it a cruciform slot, $s$, and is provided on its upper side with a correspondingly-slotted metallic plate, $a$, the longer arm of the said slot being in the median line of the length of the table and the shorter arm at right angles thereto.

Below the table, and parallel to each other, are the shafts $a\ a'$, the one directly under the other, upon which are secured, in any suitable manner, the flanged pulley-wheels $b\ b'$. Around these wheels is passed an endless belt or chain, $c$, provided at intervals with the metallic hooks $d$, which pass, as the pulleys are actuated, through the longitudinal branch of the slot $s$ above the level of the table.

The shafts $a\ a'$ have their bearings in the supports A, and the latter is provided on each of its ends, outside of its bearings, with a pulley, $f$. The shaft $a'$ derives its motion from the main driving-shaft $g$ at the rear of the device through the medium of a pulley and a belt passing around the said pulley and the pulley on the driving-shaft. The pulley $f$ on the remaining end of the shaft $a'$ is connected by means of a belt, $h$, to a pulley, $h'$, on the corresponding end of a shaft, $j$, having its bearings in the front portion of the supports A, and provided in line with the pulleys $b\ b'$ with a wheel, $k$, having projecting radially therefrom the arms $i$, arranged in pairs and at a suitable distance apart.

The main driving-shaft derives motion from the thrashing-machine by means of an endless belt or a system of gears, and has on one end a large pulley-wheel. This wheel is connected to a smaller pulley, $m$, on the end of a saw-arbor, $n$, by means of a belt, $o$. This arbor has its bearings in a curved metallic frame, $p$, sliding freely in a correspondingly-shaped guide, N, secured to the table above the same in any suitable manner.

The frame $p$ is extensible relatively to its frame, thereby lowering the saw S upon the arbor $n$ upon the table to a greater or less extent, according to the thickness of the bundles of grain.

The operation is as follows: The bundle of grain is thrown upon the table, and the operator catching hold of its butt brings the band in contact with the cutter S, thereby severing the same. As he spreads the bundle the wire drops upon the table, and is seized by the hooks that draw it through the slot $s$ of the table. The wire then drops off the hook or is removed therefrom by the clearing-wheel $k$. The grain is then pushed along the table and is passed into the thrasher by an armed wheel, W. The cutter is usually a saw, and is covered by a guard, G, inclosing all such parts thereof as would be apt to injure the operator.

In lieu of the endless belt and its hooks and pulleys, I may use a wheel armed with hooks and deriving motion from the shaft $a'$ by means of geared wheels.

What I claim as new, and desire to secure by Letters Patent, is—

1. The combination of a slotted feed-table, a cutting device, an endless belt, chain, or wheel armed with hooks working successively through the slot of the table, and a clearer working in unison with the hooks to take off the wire, substantially as specified.

2. The combination, with a feed-table having a cross-shaped slot, of the endless belt, chain, or wheel armed with hooks revolving successively through said slot, substantially as specified.

In testimony that I claim the above I have hereunto subscribed my name in the presence of two witnesses.

HIBBARD A. HIGGINS.

Witnesses:
L. P. HOYT,
C. L. HOYT.